June 12, 1962 — P. F. SWARTWOUT — 3,038,841
FERMENTATION VESSEL
Filed Feb. 16, 1960 — 2 Sheets-Sheet 1
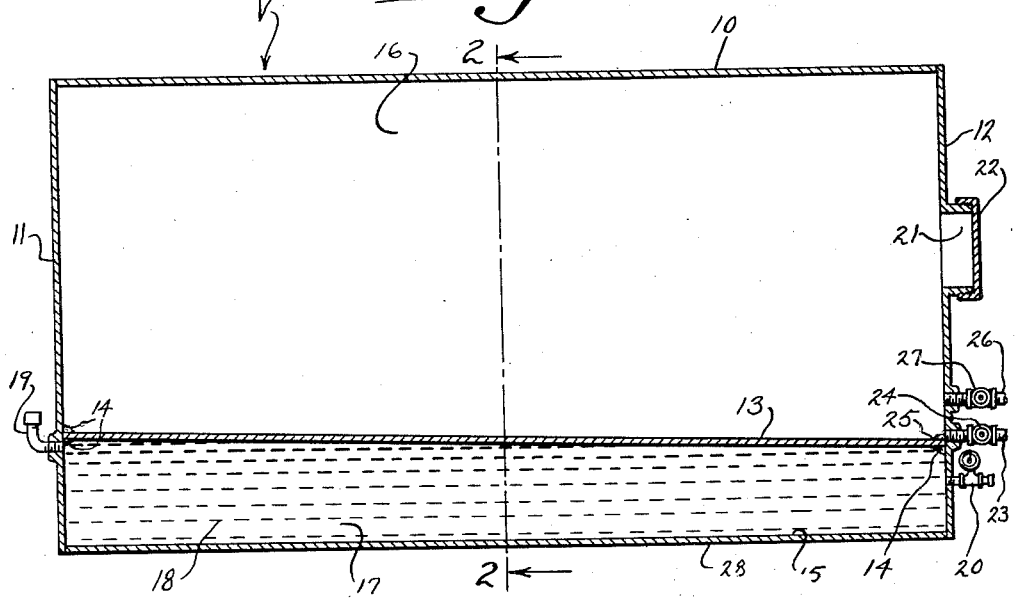
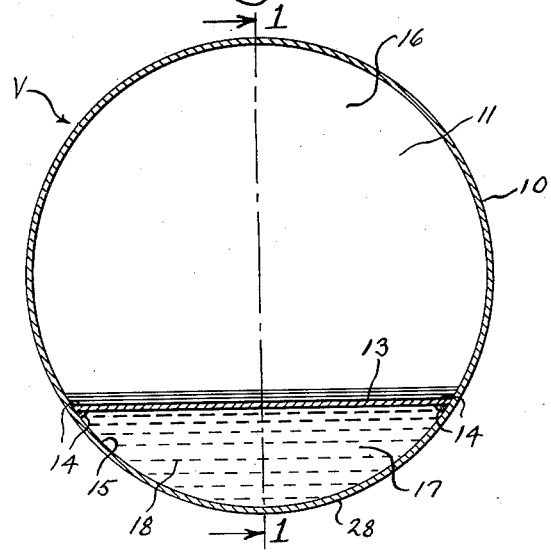
INVENTOR
PAUL F. SWARTWOUT
BY Wright and Wright
ATTORNEYS June 12, 1962  P. F. SWARTWOUT  3,038,841
FERMENTATION VESSEL
Filed Feb. 16, 1960  2 Sheets-Sheet 2
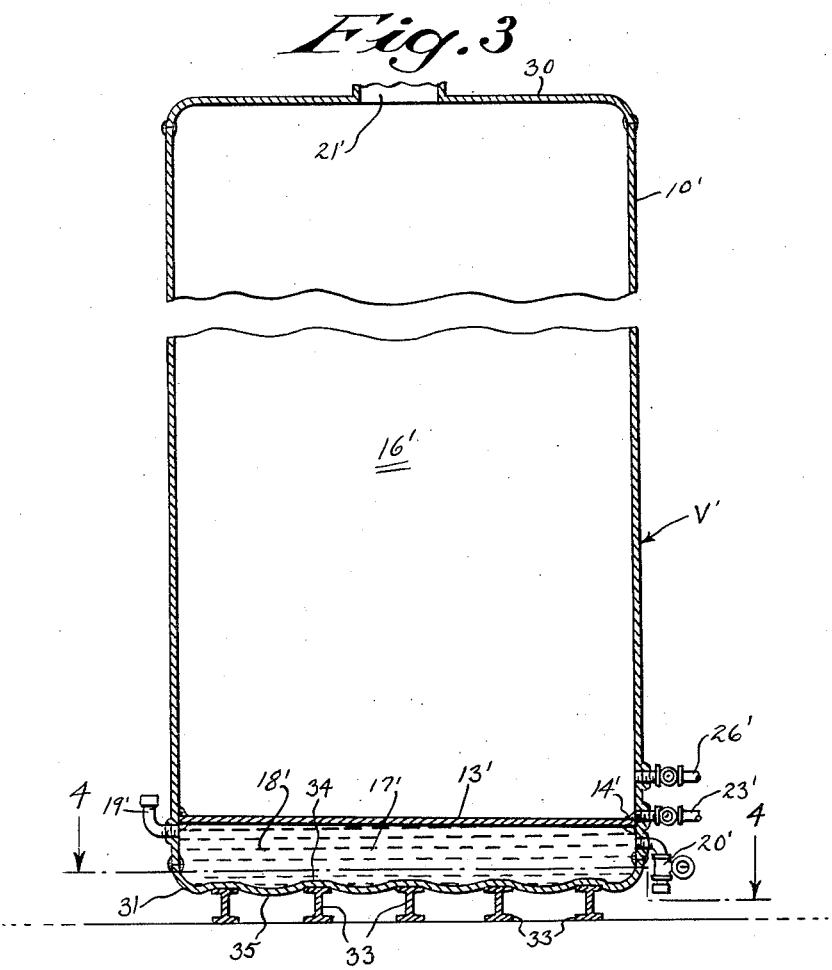
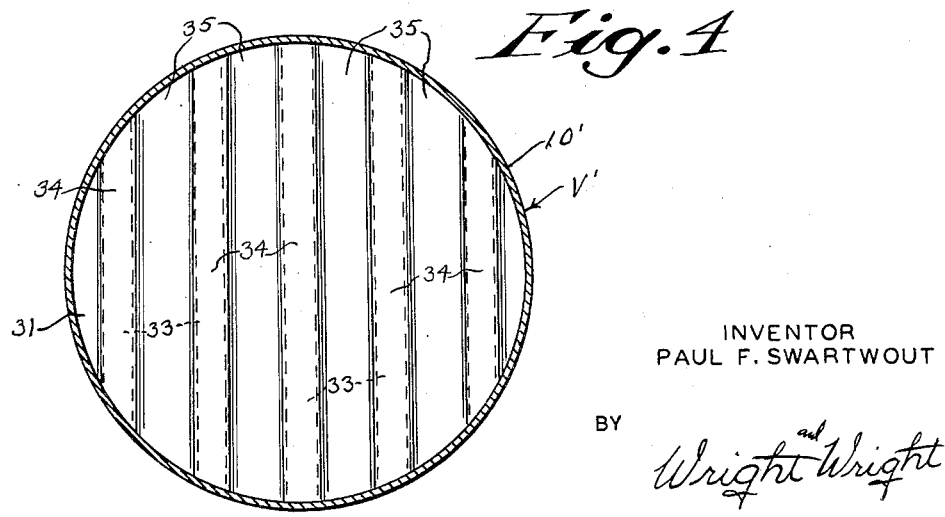
INVENTOR
PAUL F. SWARTWOUT
BY
Wright and Wright
ATTORNEYS 3,038,841
FERMENTATION VESSEL
Paul F. Swartwout, 1527 N. 37th St., Milwaukee, Wis.
Filed Feb. 16, 1960, Ser. No. 9,005
2 Claims. (Cl. 195—139)

This invention appertains to vessels and containers and more particularly to a new and improved fermentation vessel utilized primarily in the brewery industry.

One step in the brewing of beer and ale is the fermentation step. In this stage of processing, the beer or ale is pumped into large tanks or vessels and allowed to "work" for a period of time. During this time, much of the yeast settles out and the fluid is then drawn off, leaving the yeast residue at the bottom of the vessel. In order to draw off the fluid without disturbing the yeast, it has been found that the vessel should have a flat bottom. This flat surface also aids in the actual controlled settling out of the yeast. The liquid, while fermenting, is also under pressure and preferably this pressure should be great enough to aid in the drawing off of the fluid without the necessity of utilizing booster pumps and the like. These two features in the fermentation step, i.e., flat bottom and pressurized vessel, have created a problem due to the fact that the flat bottom does not provide a stable shape for the vessel, therefore much reinforcing such as steel ribbing, dunnage beams, etc., are needed to enable the vessel or tank to withstand pressure, particularly where a great amount of fluid is fermenting. In the past, and inasmuch as cylindrical shaped vessels are known to be stable and require much less reinforcement when pressurized, attempts have been made to utilize this shape container, but it was found that the yeast did not settle out properly in the rounded portion of the vessel and further, that the fluid could not be drawn off without disturbing the yeast that had settled out and therefore, the stable cylindrical shape was generally sacrificed to a flat bottom vessel.

It is therefore a primary object of my present invention to provide a cylindrical shaped fermentation vessel that is stable in that the pressure and force will be equally distributed but which does provide a flat bottom for supporting the settled yeast.

Another important object of my present invention is to provide a flat bottom or partition within a cylindrical vessel which forms two compartments, a larger upper compartment for the fermentation of the fluid and a lower compartment which is completely filled with water or some other liquid so that the forces or pressure on the flat bottom will be equally distributed to the lower curved portion of the cylinder.

A further object of my present invention is to provide a large cylindrical shaped fermentation vessel in which the relatively flat partition is positioned to slope slightly from the rear of the vessel toward the front of the vessel to insure that the bottom compartment can be completely filled with liquid, leaving no gas or air pockets.

A still further object of my present invention is to provide the front wall of the vessel with a manhole so that the tank or vessel can be entered for cleaning and repairing purposes and also to provide an outlet pipe at floor level for cleaning and drawing off the settled yeast and a pipe spaced above said cleaning or draining pipe for drawing off the fluid after it has been properly fermented.

A further object of my present invention is to provide a pressure gauge in the lower compartment so that a reading can be taken to ascertain whether or not the lower compartment is completely filled with fluid, and to indicate when properly calibrated, the height of the liquid above the flat floor of the tank and in the upper compartment.

Still another object of my present invention is to provide a cylindrical shaped fermentation vessel of an attractive appearance and of a comparatively simple construction and one which may be placed upon the market at a reasonable cost and which will be durable and efficient in use.

An important object of my present invention is to also provide a cylindrical vessel which may be placed in either a horizontal or vertical position and that when placed in the vertical position will be provided with a flat bottom or partition adjacent the lower end wall of the vessel, dividing the vessel into a larger upper compartment for the fermentation of the fluid and a lower compartment sealed therefrom, and which is completely filled with water or other fluid so that forces or pressures on the flat partition or on the flat end bottom wall will be equally distributed according to Pascal's hydraulic law, and thus any distortion of the lower bottom end wall will not be transmitted to the flat partition.

With these and other objects in view and to the end of obtaining any other advantages hereinafter appearing, this invention consists in certain features of construction and combination and arrangement of parts hereinafter described, pointed out in the claims and illustrated in the accompanying drawings.

In the drawings,

FIGURE 1 is a longitudinal vertical section through the vessel, the section being represented by the line 1—1 of FIGURE 2, of the drawings, looking in the direction of the arrows, with the vessel being shown in a horizontal position;

FIGURE 2 is a transverse vertical section taken through the vessel, the section being taken on the line 2—2 of FIGURE 1 of the drawings, looking in the direction of the arrows;

FIGURE 3 is a vertical section taken through a vessel set in the vertical position, and FIGURE 4 is a horizontal section taken on the line 4—4 of FIGURE 3 of the drawings, looking in the direction of the arrows.

Referring now to the drawings in detail, wherein similar reference characters designate corresponding parts throughout the several views, and in particular to FIGS. 1 and 2, the letter V generally indicates one type of my improved fermentation vessel and the same includes broadly an elongated cylindrical wall 10, a rear end wall 11, a front end wall 12 and a longitudinally extending floor or partition 13. The partition or bottom floor 13 is securely welded as indicated by the numeral 14 to the inner surface 15 of the cylindrical wall 10 and also to the front wall 12 and the rear wall 11. It is important that the partition 13 be completely welded (preferably above and below) and sealed to the respective walls so that the larger compartment 16 is completely sealed from the lower compartment 17. While it is not absolutely necessary, it is desirable that the floor or partition 13 slope slightly from the rear wall 11 toward the front wall 12. This is primarily due to the fact that the lower compartment 17 must be filled with water or some other liquid and it is necessary that no air pockets or gas be present in the compartment. Therefore, a filling spout or tube 19 is located in the rear wall 11 just below the high spot of the inclined floor 13. Thus, the entire compartment may be filled with the fluid and further, the fluid may be under a slight pressure.

I also provide a pressure gauge 20 which registers this slight pressure and therefore will indicate at all times whether or not the compartment 17 is completely filled with the fluid 18. The gauge 20 will also when properly calibrated indicate the height of the liquid above the flat tank floor. This means that the amount of the fermenting liquid can be accurately ascertained by proper calibration of the pressure gauge and accomplished in a sanitary manner, in that, the gauge is not communicating directly with the fluid being processed. It should be obvious at this point that the floor 13 may be set in the tank to incline slightly from its front wall 12 toward its rear wall 11 without affecting the scope of the invention.

The forward wall 12 is provided with an enlarged opening 21 and this opening is of the manhole type and is provided to give access to the interior of the vessel for cleaning and repair purposes. In general use, however, the hole is sealed and capped by providing the threaded cover 22 as shown.

The vessel is also provided with drain pipe 23 and a valve 24. This pipe 23 is placed on the same level as the lower portion 25 of the floor 13 and obviously is used to draw off the yeast deposit and to generally draw off the fluid used to clean the interior of the vessel. Spaced above this drain pipe 23 at a higher point above the general yeast deposit I provide a pipe 26 and this pipe is utilized to draw off the fermented fluid without disturbing the yeast deposited on the flat floor 13. Suitable valves 27 are provided to open and close this pipe 26.

As previously mentioned, the yeast is deposited on the flat floor 13 and inasmuch as the compartment 16 is under pressure as well as the fluid 18, and particularly since the fluid 18 completely fills the lower compartment 17, any additional force or pressure in the larger compartment 16 may be transmitted from the floor 13 through the fluid 18 and dispersed equally about the portion 28 of the curved cylindrical wall 10 and thus the advantages of a stable cylindrical shape may be utilized from the pressure standpoint and a flat floor 13 for the yeast deposit may also be taken advantage of without the necessity of building a fermentation vessel having an unstable shape and thus requiring extreme reinforcement methods and means which are expensive to use and difficult to build into the vessel. Another advantage of this particular construction is that the inner compartment 16 may be completely coated and lined with glass which will not chip off at the joints because the stable shape does not deflect, as happens to glass linings of the other types of fermentation vessels.

Referring to FIGURES 3 and 4, it can be seen that I may set my cylindrical vessel V' in a vertical position. This position is not necessarily a desirable one, but may be necessary in some instances to conserve space etc. In any event, this vessel V' is quite similar to the vessel shown in FIGURES 1 and 2 of the drawings, and includes the elongated cylindrical wall 10', upper end wall 30 and a lower end wall 31, both sealed and integral with the cylindrical wall 10'. Adjacent the lower end wall 31 of the vessel I provide the flat partition 13', and this partition is welded, preferably both above and below, as indicated by the numeral 14' to the cylindrical wall 10', thus forming the large upper compartment 16' and the lower compartment 17'. The lower compartment 17' is of course filled with water or other fluid 18' through the usual filling spout 19'. The vessel is provided with the drain pipe and valve 23' and a pipe and valve 26' utilized to draw off the fermented liquid. All of this is similar to that form of my invention described in FIGURES 1 and 2 of the drawings. The pressure gauge 20' is also provided and is similar in function and use to the pressure gauge 20. In this form of my invention the vessel is usually set on what is known as dunnage beams and these beams, particularly due to the tremendous weight of the fluid being processed in the large vessel V', cause the bottom end wall 31 to distort, as indicated by the numeral 34. Under ordinary circumstances this would make the cleaning and drawing off of the yeast extremely difficult, in that, the yeast and cleaning fluid in the vessel could gather in the low points 35 of the bottom wall and thus not properly drain.

However, when the lower compartment 17' is completely filled with fluid the distortion of the bottom wall 31 and the forces caused by the distortion will be accurately distributed according to Pascal's hydraulic law and will not therefore distort the flat partition 13. Thus the partition 13 will remain perfectly flat and smooth and the fermented yeast and cleaning fluid can be drawn off through the pipe 23'. It is obvious also that I may apply this principle to fermentation vessels now in use, and which are set up on dunnage beams, and which do not utilize my stable shape, in that they are rectangular or square in shape. By merely providing a partition spaced above the bottom wall of the vessel and then completely filling this compartment so formed with a fluid, I can alleviate the trouble caused by the distortion of the bottom.

From the foregoing, it is believed that the features and advantages of my invention will be readily apparent to those skilled in the art and it will of course be understod that changes in details of construction and in the form and proportion may be resorted to without departing from the spirit of the invention or the scope of the appended claims.

I claim:

1. A fermentation vessel including an elongated horizontally positioned cylindrical wall and end walls, said walls providing an interior compartment completely sealed from the atmosphere, an elongated flat partition positioned in said container and sealed to said cylindrical walls and said end walls, said partition being positioned well below the axial longitudinal center of said vessel and inclining slightly from one end wall to the other end wall, providing an upper compartment and a lower compartment completely sealed one from the other, liquid in said lower compartment completely filling the same to the exclusion of any air or gas pockets, whereby force and pressure in said upper compartment exerted on said flat partition will be completely dispersed to said lower cylindrical wall portion according to Pascal's law, and a pressure gauge communicating with said lower compartment for indicating the pressure of said liquid and the level of the fermenting liquid above the lower compartment in a sanitary manner not communicating directly with the fermenting liquid in process.

2. A fermentation vessel including an elongated vertically positioned cylindrical wall and end walls, said walls providing an interior compartment completely sealed from the atmosphere, an elongated flat partition positioned in said container and sealed to said cylindrical walls and said end walls, said partition being positioned well below the axial center of said vessel and inclining slightly from one end wall to the other end wall, providing an upper compartment and a lower compartment completely sealed one from the other, liquid in said lower compartment completely filling the same to the exclusion of any air or gas pockets, whereby force and pressure in said upper compartment exerted on said flat partition will be completely dispersed to said lower cylindrical wall portion according to Pascal's law, and a pressure gauge communicating with said lower compartment for indicating the pressure of said liquid and the level of the fermenting liquid above the lower compartment in a sanitary manner not communicating directly with the fermenting liquid in process.

References Cited in the file of this patent

UNITED STATES PATENTS

| | | |
|---|---|---|
| 148,331 | Sleeman et al. | Mar. 10, 1874 |
| 1,265,676 | Kamp | May 7, 1918 |
| 2,054,579 | Affleck | Sept. 15, 1936 |
| 2,162,227 | Page | June 13, 1939 |
| 2,551,217 | Martin | May 1, 1951 |